United States Patent
Adam et al.

(10) Patent No.: US 12,520,768 B2
(45) Date of Patent: Jan. 13, 2026

(54) BALING APPARATUS

(71) Applicant: AGCO International GmbH, Neuhausen (CH)

(72) Inventors: Christian Adam, Wolfenbuttel (DE); Tobias Keune, Wolfenbuttel (DE); Malte Cornelius Schlichting, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 720 days.

(21) Appl. No.: 17/821,363

(22) Filed: Aug. 22, 2022

(65) Prior Publication Data
US 2023/0085376 A1     Mar. 16, 2023

(30) Foreign Application Priority Data
Sep. 15, 2021  (GB) ...................................... 2113177

(51) Int. Cl.
*A01F 15/07*     (2006.01)
*B65B 27/12*     (2006.01)

(52) U.S. Cl.
CPC ........ *A01F 15/0715* (2013.01); *B65B 27/125* (2013.01); *A01F 2015/0745* (2013.01)

(58) Field of Classification Search
CPC .................. A01F 15/07; A01F 15/0715; A01F 2015/0745; B65B 27/125
See application file for complete search history.

(56) References Cited

U.S. PATENT DOCUMENTS

| | | | |
|---|---|---|---|
| 5,996,307 A | 12/1999 | Niemerg et al. | |
| 10,653,067 B1 | 5/2020 | Jones | |
| 2008/0121119 A1 | 5/2008 | Routledge | |
| 2012/0324830 A1 | 12/2012 | Reijersen Van Buuren | |
| 2016/0374269 A1 | 12/2016 | Jones et al. | |
| 2019/0166769 A1* | 6/2019 | Little .................. A01F 15/0715 |

(Continued)

FOREIGN PATENT DOCUMENTS

EP      3459342 A1    3/2019

OTHER PUBLICATIONS

UK Intellectual Property Office, Search report for related UK Application No. GB2113177.6, dated Mar. 11, 2022.
(Continued)

*Primary Examiner* — Mohammed S. Alawadi

(57) ABSTRACT

A loading device for loading a roll of wrapping material into a feed device of a baler from which the wrapping material may be dispensed is disclosed. The loading device comprises a lateral channel supported at a first end by a first support and at a second end by a second support, a sliding member having first and second ends mounted for reciprocal movement within the lateral channel, a support member having first and second ends, the first end of the support member mounted to the second end of the sliding member, a winch and cable apparatus, a free end of the cable extending through the support member and a carriage mounted to the free end of the cable. The carriage includes a central element with engagement elements at first and second ends of the central element for releasable engagement with a roll of wrapping material. The winch and cable apparatus enables the carriage to be raised and lowered with respect to the second end of the pivoting member.

4 Claims, 5 Drawing Sheets

(56) References Cited

U.S. PATENT DOCUMENTS

2020/0017341 A1\* 1/2020 McAfee ................ A01F 15/071
2020/0323144 A1\* 10/2020 Lebeau ................ A01F 15/071
2021/0147200 A1   5/2021 McAfee et al.

OTHER PUBLICATIONS

European Patent Office, Extended European Search Report related to Patent Application No. EP22191566.3, dated Feb. 13, 2023, 7 pages.

\* cited by examiner

# BALING APPARATUS

FIELD OF THE INVENTION

The present invention relates to a loading apparatus for a baling apparatus and in particular for a baling apparatus for producing round bales.

BACKGROUND

Round balers are well known in the art. Such balers pick up a harvested crop and feed the crop into a baling chamber where it is compressed into a cylindrical bale. Before ejecting the formed bale from the baler it is necessary to wrap or bind the formed bale with a binding material. The binding material is typically supplied as roll of binding material. It will be appreciated that such rolls of binding material are a major consumable in the operation of such a baler. Additionally, such rolls of binding material are heavy and cumbersome to manoeuvre. Rolls of binding material typically measure between 122 to 130 centimetres (48 to 51 inches) in length and weigh between 30 and 45 kilograms (70 to 100 pounds). As such, loading such rolls into position onto the baler by an operator, such that the binding material can then be arranged to be delivered into the baling chamber, is a burdensome task, and one that needs to repeated throughout the operation of the baler.

A number of solutions to this problem have been proposed. The present invention aims to provide a better solution.

SUMMARY OF THE INVENTION

According to a first aspect of the present invention, in a loading device for loading a roll of wrapping material into a feed device of a baler from which the wrapping material may be dispensed, the feed device including a reservoir for receiving a roll of wrapping material, the loading device comprises a lateral channel supported at a first end by a first support and at a second end by a second support, a sliding member having first and second ends mounted for reciprocal movement within the lateral channel, a support member having first and second ends, the first end of the support member mounted to the second end of the sliding member, a winch and cable apparatus, a free end of the cable extending through the support member and a carriage mounted to the free end of the cable, the carriage comprising a central element with engagement elements at first and second ends of the central element for releasable engagement with a roll of wrapping material, the winch and cable apparatus enabling the carriage to be raised and lowered with respect to the second end of the pivoting member.

Preferably, the first support and the second support are pivotally mounted for movement about a first horizontal axis between a storage position and a deployed position.

Preferably the carriage is releasably mounted to the free end of the cable.

According to a second aspect of the invention a baler comprises a baler frame and a loading device according to the first aspect of the invention in which the first and second supports are mounted to the baler frame.

This has as an advantage that the task of management of the rolls of wrapping material is made substantially easier.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
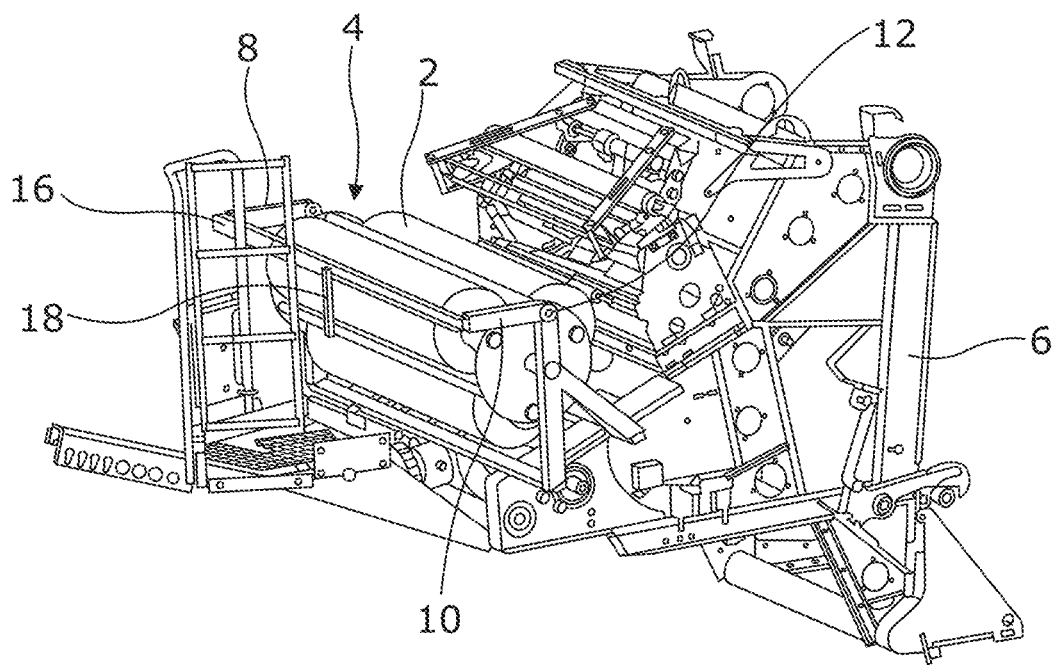
FIG. 1 shows a perspective view of a wrapping material loading apparatus in accordance with the present invention in an initial first position.

With reference first to FIG. 1, a loading device for loading a roll 2 of wrapping material to a storage location 4 or reservoir is shown. In the illustrated embodiment the storage location 4 comprises a rotatable magazine having a number of locations in which rolls of wrapping material may be stored.

The magazine is mounted to a frame 6 of a baler. In the illustrated embodiment the baler frame is suitable for a round baler having a baling chamber of fixed diameter. Nevertheless, the invention is also suitable for use with a round baler of variable diameter.

The loading device is also connected to the frame 6 of the baler. The loading device includes first and second pivotable uprights 8,10. A first end of each upright 8,10 is mounted for pivotable movement about a first pivot axis 12 extending horizontally across the baler frame 6. The first end of each upright 8,10 can be pivoted between a storage position and a deployed position. A channel member 14 extends between second ends of each upright 8,10. It can be seen from the Figures that the channel member 14 extends transversely across a width of the frame 6 of the baler.

A sliding member 16 is provided in the channel member 14. The sliding member 16 is able to move back and forth within the channel member 14 for reciprocating movement therein. The sliding member 16 is provided at a second end with a support member or bracket 18 extending substantially perpendicularly to the sliding member 16. Conveniently, the bracket 18 is located at a second end of the sliding member

16. In the illustrated embodiment, the sliding member 16 is around half the length of the channel member 14 such that when the sliding member 16 is in a first fully retracted position (cf FIG. 1), with a first end of the sliding member 16 abutting a first end of the channel member 14, the bracket 18 is located in a middle region of the channel member 14.

A cable 20, forming part of a winch and cable apparatus, runs through the channel member 14, the sliding member 16 and the bracket 18 such that a free end of the cable 20 extends from a second end of the bracket 18.

The loading device further includes a wrapping material roll support 30. The wrapping material roll support 30 comprising a central element 32 with engagement elements 34 at first and second ends of the central element 32. The wrapping material roll support 30 is adapted to be releasably connected in a central region to the free end of the cable 20. The engagement elements 34 are adapted to support the free ends of a central tube of the roll 2 of wrapping material about which the wrapping material to be dispensed is wound.

In an initial position (FIG. 1) the sliding member 16 is fully retracted within the channel member 14. The channel member 14 is itself is displaced to a storage position adjacent one side of the wrapping material storage location 4.

Figure 2:
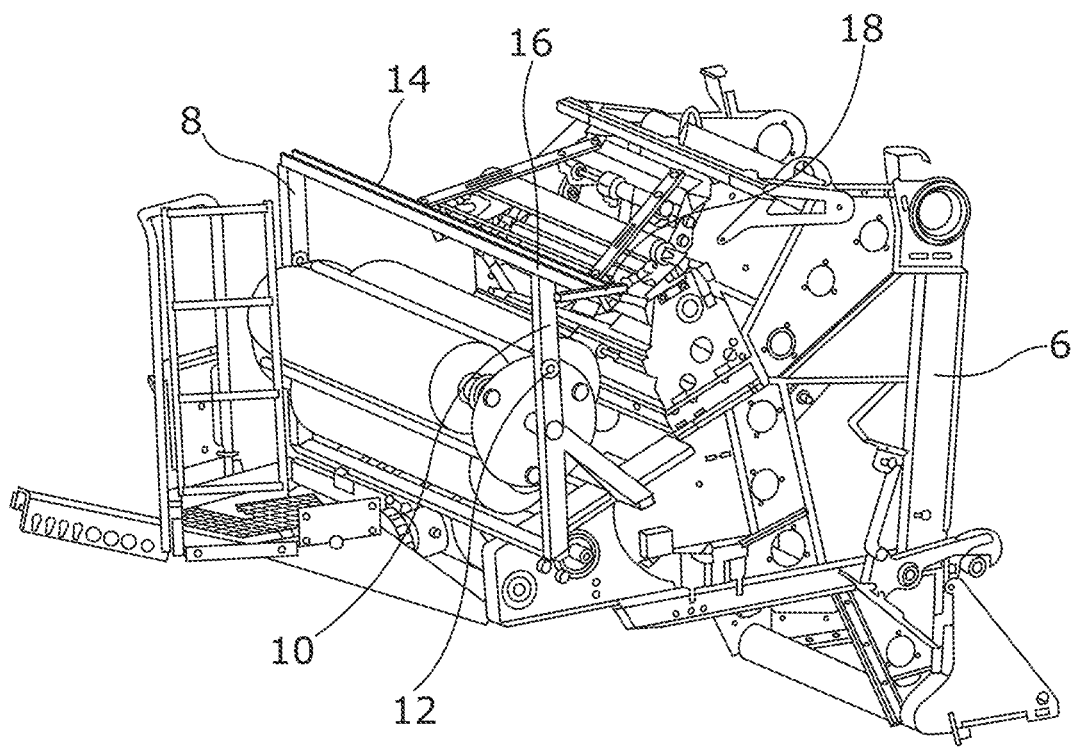
FIG. 2 shows a perspective view of the wrapping material loading apparatus of FIG. 1 in a second position.

In a first operation the pivotable uprights 8,10 are moved from the storage position to the deployed position. This moves the channel member 14 to a second position located above the wrapping material storage location 4. The sliding member 16 is then moved from the first fully retracted position to a second extended position in which the bracket 18 extends beyond one side of the baler frame 6 (FIG. 2).

Figure 3:
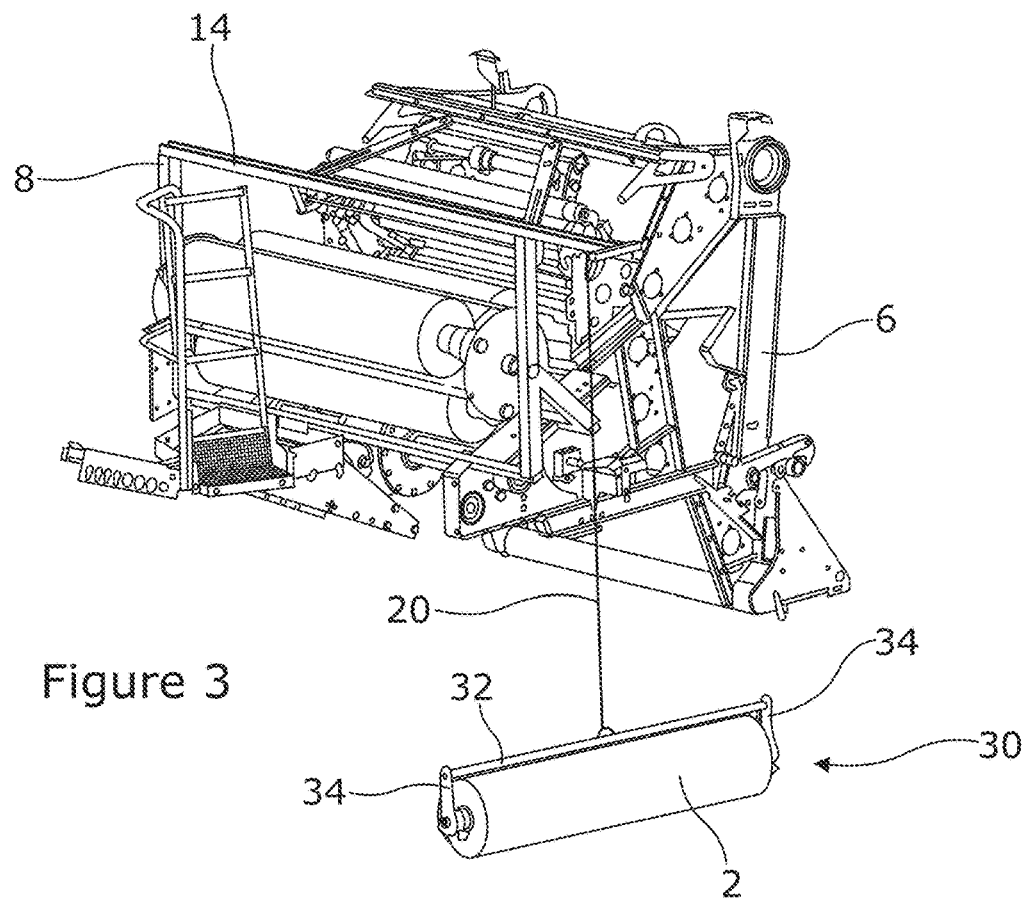
FIG. 3 shows a perspective view of the wrapping material loading apparatus of FIG. 1 in the third position together with a roll of wrapping material.

The winch and cable apparatus can now be operated to lower a free end of the cable 20. The operator has in the meantime connected a roll 2 of wrapping material to the wrapping material roll support (FIG. 3).

Figure 4:
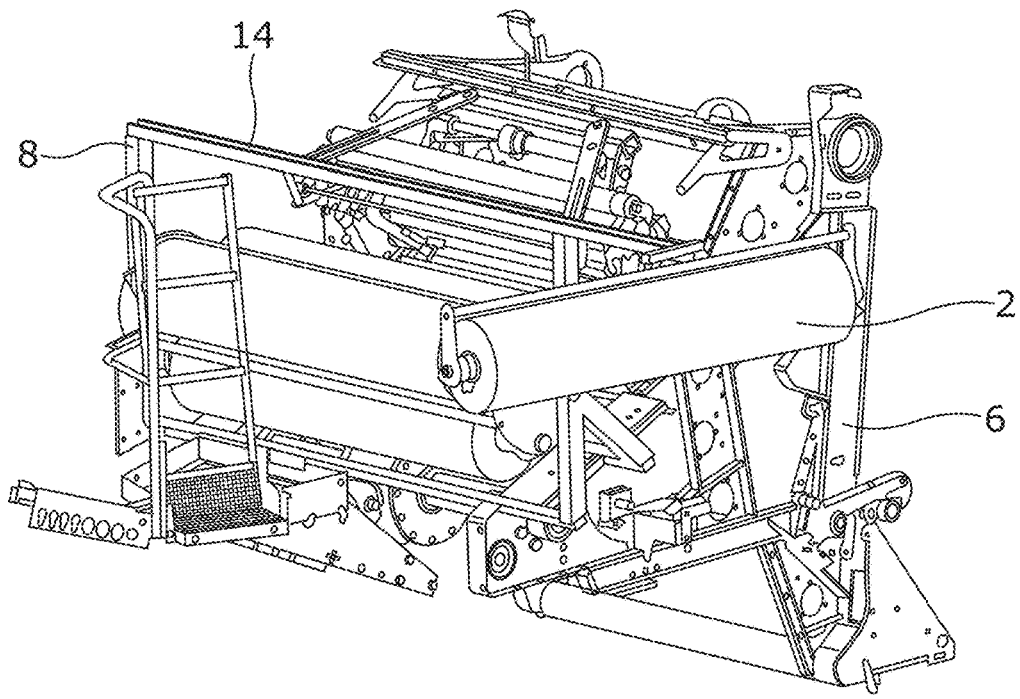
FIG. 4 shows a perspective view of the wrapping material loading apparatus of FIG. 1 in a fourth position.

The operator connects the free end of the cable 20 to the wrapping material roll support 30 and operates the winch and cable apparatus to raise the wrapping material roll support 30 toward the bracket 18 (FIG. 4).

In an alternative embodiment (not shown) the wrapping material roll support 30 is permanently connected to the free end of the cable 20 and an operator first operates the winch and cable apparatus to deploy the wrapping material roll support 30 from a raised position until sufficiently lowered to allow the operator to connect the roll 2 of wrapping material to the wrapping material roll support. Once the roll 2 of wrapping material is connected to the wrapping material roll support, the operator then operates the winch and cable apparatus to raise the wrapping material roll support 30 toward the bracket 18.

Figure 5:
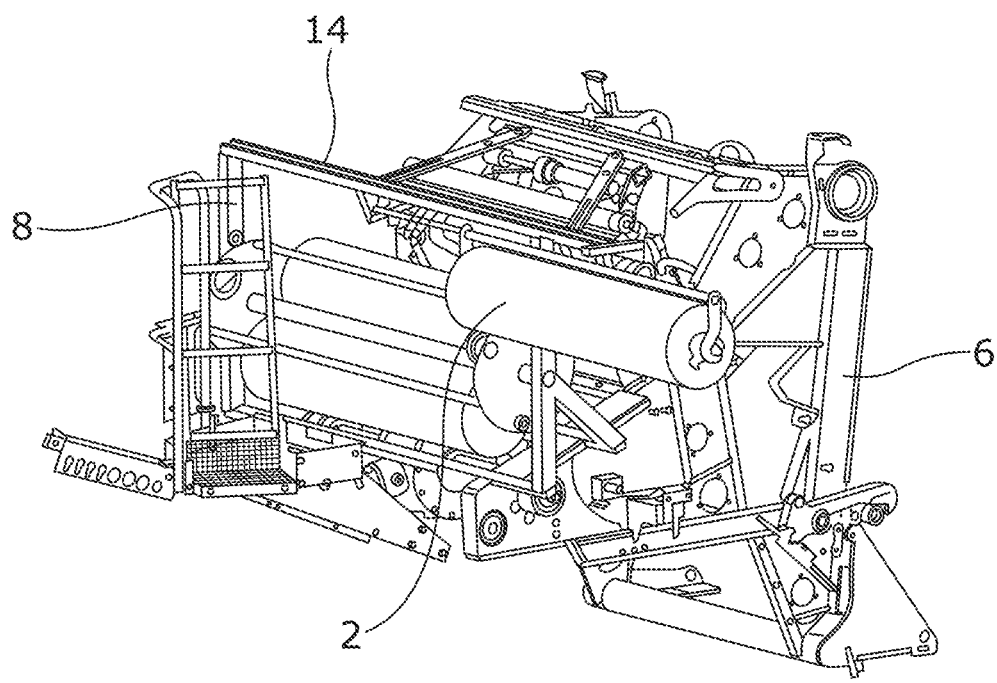
FIG. 5 shows a perspective view of the wrapping material loading apparatus of FIG. 1 in a fifth position.

In either embodiment, the operator then rotates the wrapping material roll support 30 such that the wrapping material roll support 30 is substantially aligned with the channel member 14 and the sliding member 16 (FIG. 5).

Figure 6:
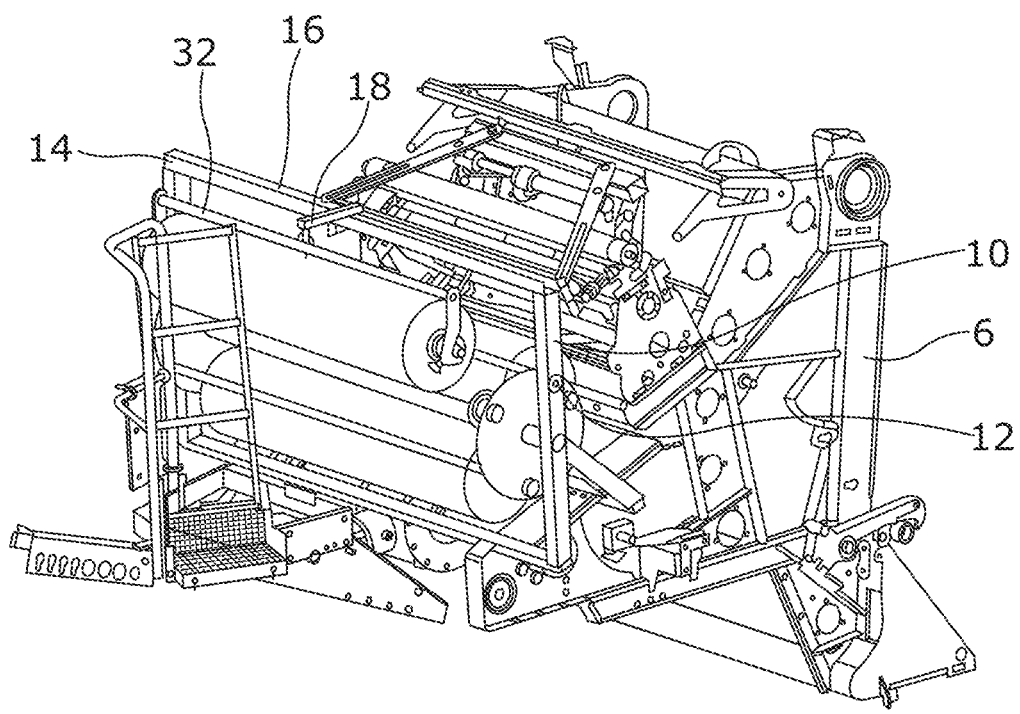
FIG. 6 shows a perspective view of the wrapping material loading apparatus of FIG. 1 in a sixth position.
Figure 7:
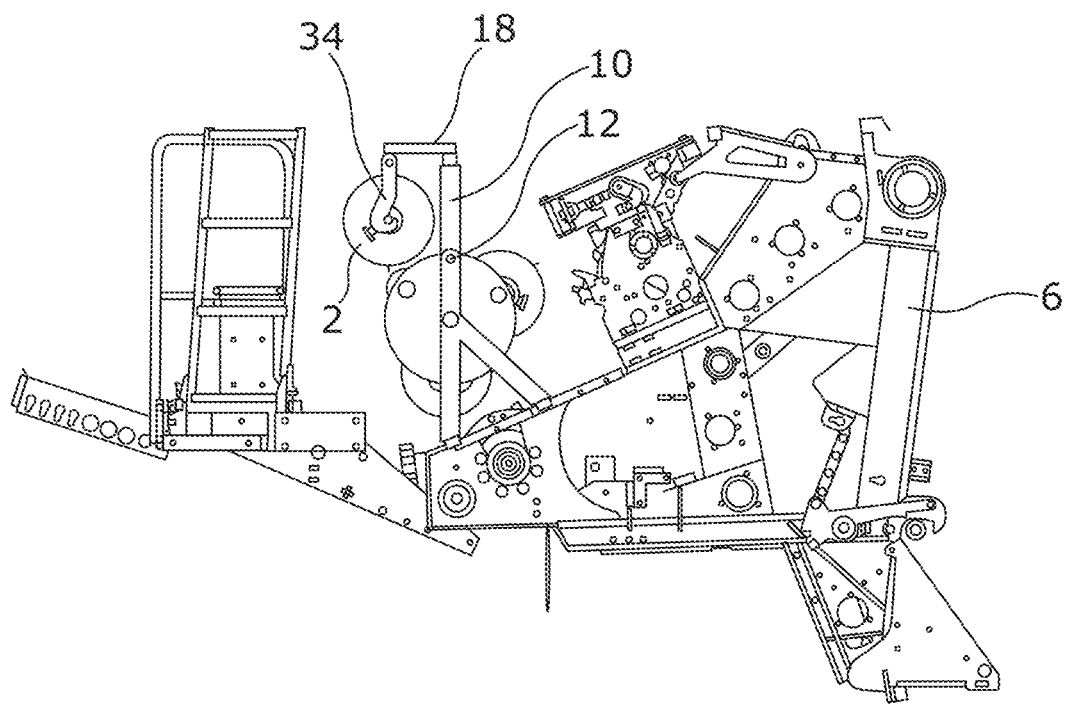
FIG. 7 shows a side view of the wrapping material loading apparatus of FIG. 1 in the sixth position.

The sliding member 16 is then returned to the fully retracted position. This brings the roll 2 of wrapping material into a position above the storage location (FIGS. 6 and 7).

Figure 8:
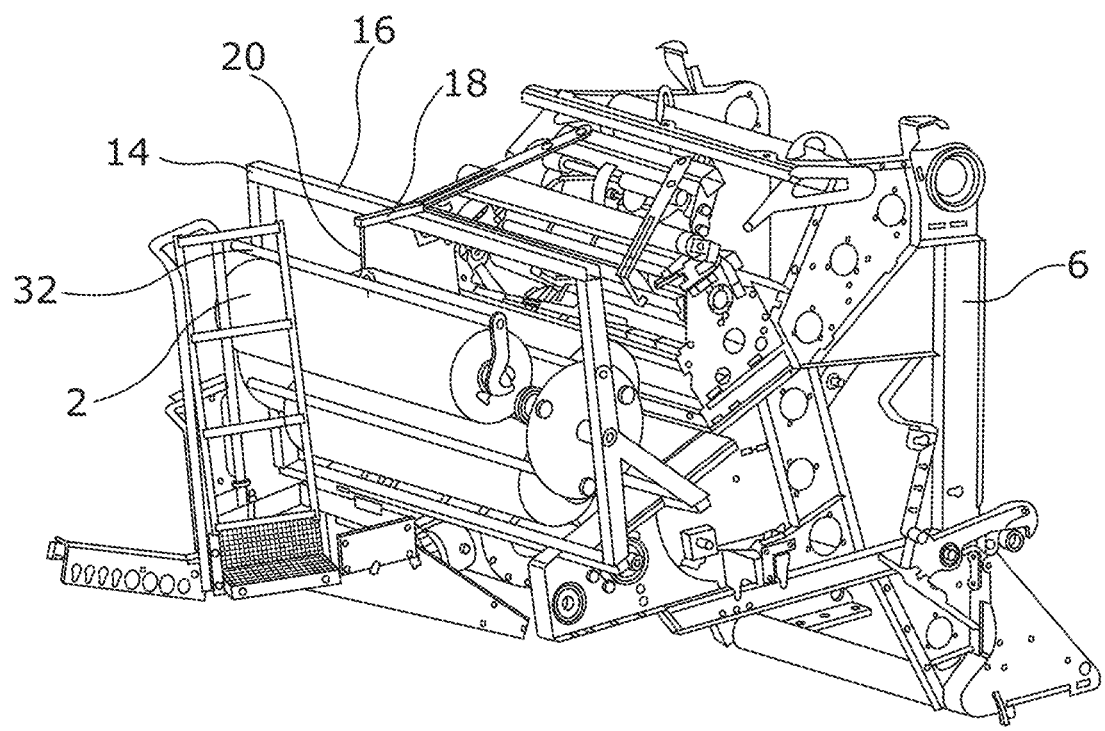
FIG. 8 shows a perspective view of the wrapping material loading apparatus of FIG. 1 in a seventh position.

The winch and cable apparatus is then operated to lower the wrapping material roll support 20 toward the wrapping material storage location 4 (FIG. 8).

Figure 9:
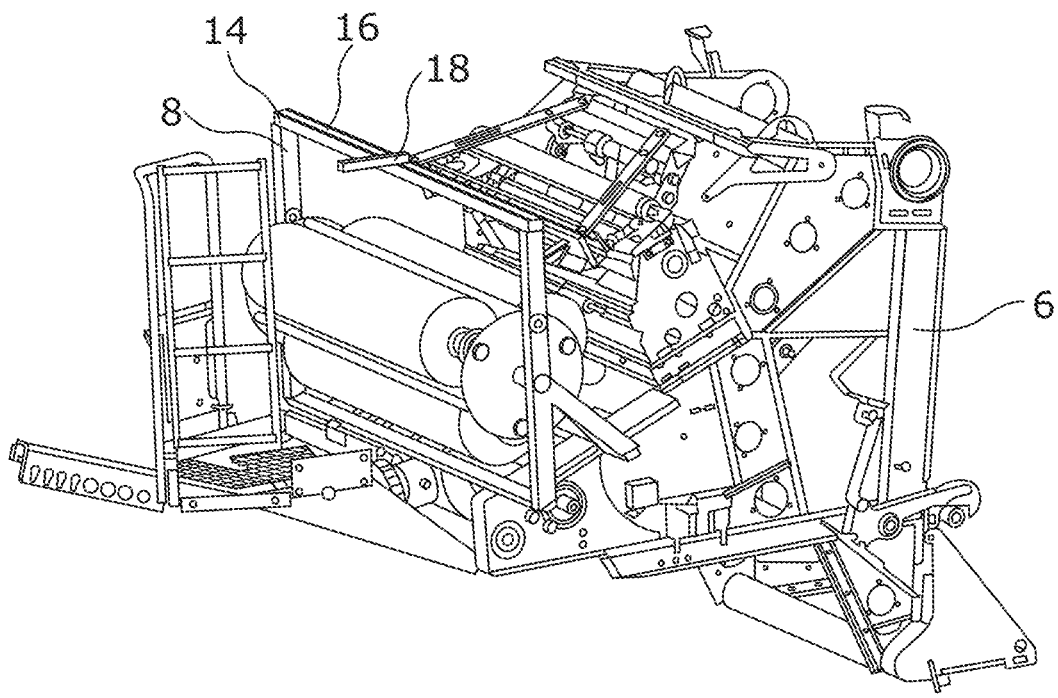
FIG. 9 shows a perspective view of the wrapping material loading apparatus of FIG. 1 in an eighth position.
Figure 10:
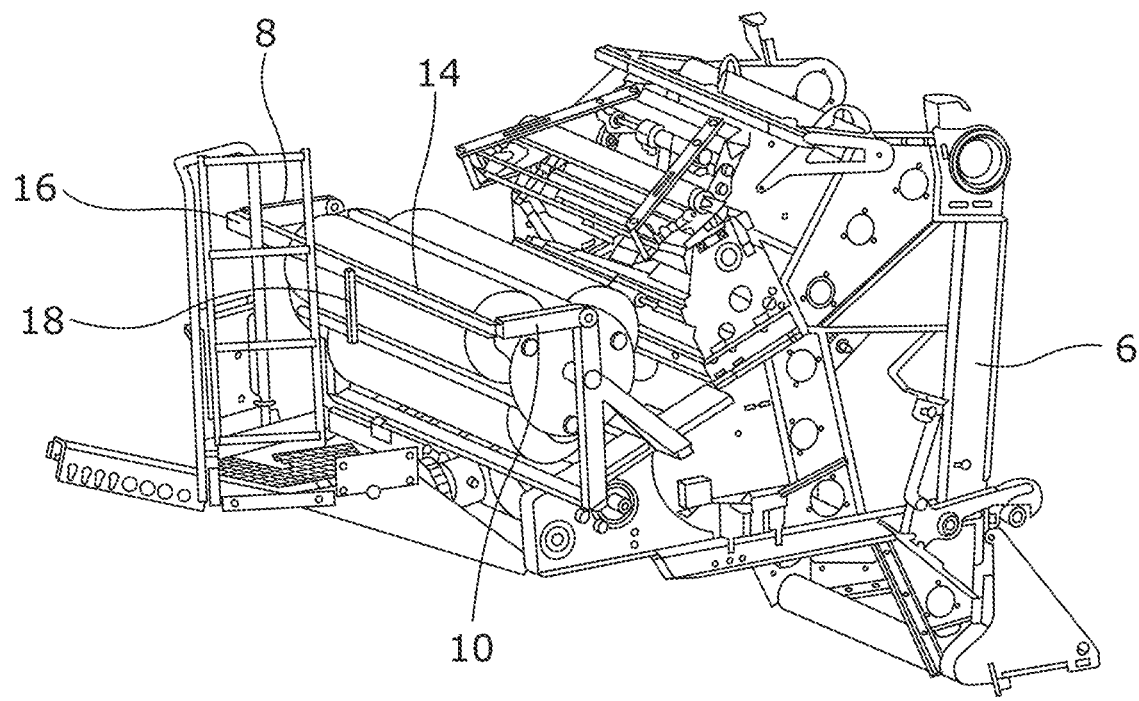
FIG. 10 shows a perspective view of the wrapping material loading apparatus of FIG. 1 in a final position.

The operator can then remove the roll 2 of wrapping material from the wrapping material roll support 30 and install it in the wrapping material storage location 4 (FIG. 9).

Finally, the operator can return the pivotable uprights 8,10 from the second position to the first position such that the channel member 14 is returned to the storage position adjacent the storage location 4.

From reading the present disclosure, other modifications will be apparent to persons skilled in the art. Such modifications may involve other features which are already known in the field of round balers and component parts therefore and which may be used instead of or in addition to features already described herein.

The invention claimed is:

1. A loading device for loading a roll of wrapping material into a feed device of a baler from which the wrapping material is dispensed, the feed device including a reservoir for receiving a roll of wrapping material, the loading device comprising a lateral channel supported at a first end by a first support and at a second end by a second support, a sliding member having first and second ends mounted for reciprocal movement within the lateral channel, a support member having first and second ends, the first end of the support member mounted to the second end of the sliding member, a winch and cable apparatus, a free end of the cable extending through the support member and a carriage mounted to the free end of the cable, the carriage comprising a central element with engagement elements at first and second ends of the central element for releasable engagement with a roll of wrapping material, the winch and cable apparatus enabling the carriage to be raised and lowered with respect to the second end of the sliding member.

2. The loading device according to claim 1, wherein the first support and the second support are pivotally mounted for movement about a first horizontal axis between a storage position and a deployed position.

3. The loading device according to loading device according to claim 1, wherein the carriage is releasably mounted to the free end of the cable.

4. A baler comprising a baler frame and the loading device according to any of claim 1 to claim 3, wherein the first and second supports are mounted to the baler frame.

* * * * *